(12) United States Patent
Adamczyk (10) Patent No.: US 7,283,620 B2
(45) Date of Patent: Oct. 16, 2007

(54) SYSTEMS AND METHODS FOR ORIGINATING AND SENDING A VOICE MAIL MESSAGE TO AN INSTANT MESSAGING PLATFORM

(75) Inventor: Maria Adamczyk, Alpharetta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 407 days.

(21) Appl. No.: 10/355,931

(22) Filed: Jan. 31, 2003

(65) Prior Publication Data

US 2004/0151284 A1 Aug. 5, 2004
US 2006/0262909 A9 Nov. 23, 2006

Related U.S. Application Data

(63) Continuation-in-part of application No. 10/232,749, filed on Sep. 3, 2002, now Pat. No. 6,707,890, which is a continuation-in-part of application No. 09/513,005, filed on Feb. 25, 2000, now Pat. No. 6,882,708.

(60) Provisional application No. 60/121,929, filed on Feb. 26, 1999, provisional application No. 60/121,893, filed on Feb. 26, 1999.

(51) Int. Cl.
*H04M 11/00* (2006.01)
*H04M 1/64* (2006.01)

(52) U.S. Cl. ............... 379/88.13; 379/88.17; 379/88.22

(58) Field of Classification Search ........... 379/88.13, 379/88.14, 88.16, 88.17, 88.18, 93.01, 201.01; 709/206
See application file for complete search history.

(56) References Cited

U.S. PATENT DOCUMENTS 4,930,152 A 5/1990 Miller (Continued)

FOREIGN PATENT DOCUMENTS

EP 0255325 2/1988

(Continued)

OTHER PUBLICATIONS

M. Day, et al.; Instant Messaging/Presence Protocol Requirements; Feb. 2000; pp. 1-25.

(Continued)

*Primary Examiner*—Fan Tsang
*Assistant Examiner*—Joseph T Phan
(74) *Attorney, Agent, or Firm*—Thomas, Kayden, Horstemeyer & Risley, LLP (57) ABSTRACT

Systems and methods for originating and sending a voice mail message to an instant messaging platform. One particular system includes a voice mail service adapted to receive a voice mail message and information associated with a recipient subscriber, request an instant messaging address associated with the recipient subscriber's information, and encode the voice mail message for transmission to an instant messaging platform. The system also includes an associated database adapted to provide the voice mail service with an instant messaging address associated with the recipient subscriber's information. Further, the system includes an instant messaging platform adapted to receive the encoded voice mail message from the voice mail service. Also, the system includes a network in communication with the voice mail platform and the instant messaging platform, wherein the voice mail platform transmits the encoded voice mail message to the instant messaging address, and the network routes the encoded voice mail message to the instant messaging platform.

17 Claims, 4 Drawing Sheets

U.S. PATENT DOCUMENTS

| | | | | |
|---|---|---|---|---|
| 4,933,967 | A | 6/1990 | Lo et al. | |
| 4,951,044 | A | 8/1990 | Nelson et al. | 340/7.22 |
| 5,058,152 | A | 10/1991 | Solomon et al. | |
| 5,313,515 | A | 5/1994 | Allen et al. | |
| 5,353,331 | A | 10/1994 | Emery et al. | |
| 5,361,295 | A | 11/1994 | Solomon et al. | |
| 5,425,091 | A | 6/1995 | Josephs | |
| 5,493,607 | A | 2/1996 | Arumainayagam et al. | |
| 5,521,969 | A | 5/1996 | Paulus et al. | |
| 5,559,800 | A | 9/1996 | Mousseau et al. | 370/85.13 |
| 5,572,578 | A | 11/1996 | Lin et al. | |
| 5,572,583 | A | 11/1996 | Wheeler, Jr. et al. | |
| 5,631,948 | A | 5/1997 | Bartholomew et al. | |
| 5,680,442 | A | 10/1997 | Bartholomew et al. | |
| 5,684,862 | A | 11/1997 | Finnigan | |
| 5,687,220 | A | 11/1997 | Finnigan | |
| 5,692,033 | A | 11/1997 | Farris | |
| 5,712,903 | A | 1/1998 | Bartholomew et al. | |
| 5,717,742 | A | 2/1998 | Hyde-Thomson | |
| 5,740,230 | A | 4/1998 | Vaudreuil | |
| 5,740,231 | A | 4/1998 | Cohn et al. | |
| 5,742,668 | A | 4/1998 | Pepe et al. | |
| 5,742,763 | A | 4/1998 | Jones | |
| 5,742,769 | A | 4/1998 | Lee et al. | |
| 5,742,905 | A | 4/1998 | Pepe et al. | |
| 5,764,747 | A | 6/1998 | Yue et al. | |
| 5,768,348 | A | 6/1998 | Solomon et al. | |
| 5,790,637 | A | 8/1998 | Johnson et al. | |
| 5,802,466 | A | 9/1998 | Gallant et al. | |
| 5,812,639 | A | 9/1998 | Bartholomew et al. | |
| 5,812,670 | A | 9/1998 | Micali | |
| 5,832,072 | A | 11/1998 | Rozenblit | |
| 5,832,221 | A | 11/1998 | Jones | |
| 5,838,768 | A | 11/1998 | Sumar et al. | |
| 5,848,132 | A | 12/1998 | Morley et al. | |
| 5,884,160 | A | 3/1999 | Kanazaki | |
| 5,905,774 | A | 5/1999 | Tatchell et al. | |
| 5,930,479 | A | 7/1999 | Hall | |
| 5,940,478 | A | 8/1999 | Vaudreuil et al. | |
| 5,940,740 | A * | 8/1999 | Aas et al. | 340/7.22 |
| 5,987,317 | A | 11/1999 | Venturini | |
| 5,999,595 | A | 12/1999 | Shaffer et al. | |
| 6,002,751 | A | 12/1999 | Shaffer | |
| 6,005,845 | A | 12/1999 | Svennesson et al. | |
| 6,005,922 | A | 12/1999 | Longster et al. | |
| 6,006,087 | A | 12/1999 | Amin | 455/413 |
| 6,061,432 | A | 5/2000 | Wallace et al. | |
| 6,064,723 | A | 5/2000 | Cohn et al. | |
| 6,064,876 | A | 5/2000 | Ishida et al. | |
| 6,069,890 | A | 5/2000 | White et al. | |
| 6,122,348 | A | 9/2000 | French-St. George et al. | |
| 6,148,069 | A | 11/2000 | Ekstrom et al. | |
| 6,169,795 | B1 | 1/2001 | Dunn et al. | |
| 6,181,780 | B1 | 1/2001 | Finnigan | |
| 6,209,100 | B1 | 3/2001 | Robertson et al. | |
| 6,219,694 | B1 | 4/2001 | Lazaridis et al. | 709/206 |
| 6,226,359 | B1 | 5/2001 | Montgomery et al. | |
| 6,233,318 | B1 | 5/2001 | Picard et al. | |
| 6,233,430 | B1 | 5/2001 | Helferich | |
| 6,243,374 | B1 | 6/2001 | White et al. | |
| 6,259,892 | B1 | 7/2001 | Helferich | |
| 6,292,799 | B1 | 9/2001 | Peek et al. | |
| 6,301,349 | B1 | 10/2001 | Malik | |
| 6,317,484 | B1 | 11/2001 | McAllister | |
| 6,330,079 | B1 | 12/2001 | Dugan et al. | |
| 6,339,640 | B1 | 1/2002 | Chen et al. | |
| 6,389,276 | B1 | 5/2002 | Brilla et al. | |
| 6,393,908 | B1 | 5/2002 | Swain et al. | |
| 6,408,176 | B1 | 6/2002 | Urs | |
| 6,418,200 | B1 | 7/2002 | Ciccolella et al. | |
| 6,507,643 | B1 | 1/2003 | Groner | 379/88.14 |
| 6,654,601 | B2 | 11/2003 | Picoult et al. | |
| 6,707,890 | B1 * | 3/2004 | Gao et al. | 379/88.12 |
| 6,782,081 | B2 * | 8/2004 | Malik | 379/93.17 |
| 6,865,384 | B2 * | 3/2005 | Sagi et al. | 455/412.1 |
| 6,882,708 | B1 | 4/2005 | Bedingfield et al. | |
| 6,981,223 | B2 * | 12/2005 | Becker et al. | 715/753 |
| 6,999,565 | B1 * | 2/2006 | Delaney et al. | 379/88.17 |
| 2001/0033639 | A1 | 10/2001 | Martin | 379/88.14 |
| 2001/0044297 | A1 | 11/2001 | Myer et al. | |
| 2002/0067806 | A1 | 6/2002 | Rodriguez et al. | 379/88.12 |
| 2002/0077082 | A1 | 6/2002 | Cruickshank | 455/413 |
| 2002/0087643 | A1 | 7/2002 | Parsons et al. | 709/206 |
| 2002/0090963 | A1 | 7/2002 | Avalos et al. | 455/466 |
| 2002/0110226 | A1 | 8/2002 | Kovales et al. | |
| 2002/0173306 | A1 | 11/2002 | Adamany et al. | 455/432 |
| 2002/0173308 | A1 | 11/2002 | Dorenbosch et al. | 455/435 |
| 2002/0181673 | A1 | 12/2002 | Henry et al. | 379/88.22 |
| 2003/0002632 | A1 | 1/2003 | Bhogal et al. | |
| 2003/0027560 | A1 | 2/2003 | Jammal | 455/417 |
| 2003/0095643 | A1 | 5/2003 | Fortman et al. | |
| 2003/0147512 | A1 * | 8/2003 | Abburi | 379/88.22 |
| 2003/0194990 | A1 | 10/2003 | Helferich | |
| 2004/0076272 | A1 * | 4/2004 | Zafar et al. | 379/88.13 |
| 2004/0161089 | A1 * | 8/2004 | Hanson et al. | 379/88.17 |
| 2005/0020288 | A1 * | 1/2005 | Davis et al. | 455/466 |
| 2005/0055411 | A1 * | 3/2005 | Bouchard et al. | 709/206 |
| 2005/0136896 | A1 * | 6/2005 | Ward et al. | 455/413 |
| 2005/0286689 | A1 * | 12/2005 | Vuori | 379/88.22 |

FOREIGN PATENT DOCUMENTS

| | | |
|---|---|---|
| EP | 0412799 | 2/1991 |
| EP | 0507125 | 10/1992 |
| EP | 0543235 | 5/1993 |
| EP | 0624967 | 11/1994 |
| EP | 0662762 | 7/1995 |
| EP | 0782304 | 7/1997 |
| EP | 0782315 | 7/1997 |
| EP | 0782316 | 7/1997 |
| EP | 0813162 | 12/1997 |
| EP | 0825752 | 2/1998 |
| EP | 0841796 | 5/1998 |
| EP | 0886228 | 12/1998 |
| EP | 0843453 | 11/2006 |
| WO | WO97/08901 | 3/1997 |

OTHER PUBLICATIONS

M. Day et al.; A Model for Presence and Instant Messaging; Feb. 2000; pp. 1-17.

Anderl, et al.; An Enhanced Message Networking Topology: Multimedia Messaging with the Intuity (TM) Interchange Server; Bell Labs Technical Journal; Apr. - Jun. 1998; pp. 124-135.

"Die T-Net-Box-der Anrufbeanworter im Netz"; 1998; 8 pages.

"General Recommendations on Telephone Switching and Signaling - Introduction to Intelligent Network Capability Set 1"; International Telecommunications Union; ITU-T Recommendation Q. 1211; Mar. 1993; 30 pages.

"The Bellcore and ITU-T Call Model Operations"; 1998; pp. 70-93.

"Transactions in Intelligent Networks"; 1998; pp. 436-477.

F. Bosco; Voice Services on the Intelligent Network: Intelligent Peripherals and Service Nodes; Aug. 1992; 4 pages.

* cited by examiner

SYSTEMS AND METHODS FOR ORIGINATING AND SENDING A VOICE MAIL MESSAGE TO AN INSTANT MESSAGING PLATFORM

RELATED APPLICATIONS

This is a continuation-in-part of application Ser. No. 09/513,005, filed Feb. 25, 2000, now U.S. Pat. No. 6,882,708, which claims the benefit of U.S. Provisional Application No. 60/121,893, filed Feb. 26, 1999, and U.S. Provisional Application No. 60/121,929, filed Feb. 26, 1999. All of the above referenced applications are incorporated herein by reference. This is also a continuation-in-part application of application Ser. No. 10/232,749, filed Sep. 3, 2002, which has issued as U.S. Pat. No. 6,707,890.

FIELD OF THE INVENTION

The invention is directed generally to messaging systems, and more specifically relates to systems and methods for originating and sending a voice mail message to an instant messaging platform.

BACKGROUND OF THE INVENTION

Voice mail is a commonly available call service option for subscribers. When a first subscriber (a "calling subscriber") calls a second subscriber (a "retrieving subscriber"), and the retrieving subscriber cannot or is unable to answer the call, the calling subscriber can be connected to a voice mail service to leave a message for the retrieving subscriber. The retrieving subscriber may then obtain or retrieve the message when he or she returns home and checks the voice mail service, or alternatively, the retrieving subscriber may check and obtain the message remotely via a call to the voice mail service. Delays in obtaining a voice mail message from home or remotely via a call to the voice mail service can be burdensome and time consuming to the retrieving subscriber, since the retrieving subscriber does not know when there is an incoming call or when a message has been left with the voice mail service. Moreover, the delay for the calling subscriber in establishing contact with or otherwise communicating with the retrieving subscriber can be burdensome and time consuming.

Messaging platforms and associated protocols such as instant messaging now exist. However, there is no link between these types of messaging platforms and associated protocols and existing voice mail services.

Therefore, a need exists for systems and methods for originating and sending a voice mail message to an instant messaging platform.

A need also exists for systems and methods for receiving a voice mail message at an instant messaging platform.

Still another need exists for systems and methods for responding to a voice mail message received at an instant messaging platform.

SUMMARY OF THE INVENTION

Systems and methods according to various embodiments of the invention address some or all of the above issues and combinations thereof. They do so by providing systems and methods including a voice mail service with instant messaging capabilities.

One aspect of systems and methods according to various embodiments of the invention focuses on systems for originating and sending a voice mail message to an instant messaging platform. One particular system includes a voice mail service adapted to receive a voice mail message and information associated with a recipient subscriber, request an instant messaging address associated with the recipient subscriber's information, and encode the voice mail message for transmission to an instant messaging platform. The system also includes an associated database adapted to provide the voice mail service with an instant messaging address associated with the recipient subscriber's information. Further, the system includes an instant messaging platform adapted to receive the encoded voice mail message from the voice mail service. Also, the system includes a network in communication with the voice mail platform and the instant messaging platform, wherein the voice mail platform transmits the encoded voice mail message to the instant messaging address, and the network routes the encoded voice mail message to the instant messaging platform.

Another aspect of systems and methods according to various embodiments of the invention focuses on methods for originating and sending a voice mail message to an instant messaging platform. One particular method for originating and sending a voice mail message to an instant messaging platform includes receiving a voice mail message for a recipient; based upon recipient's identifying information, retrieving an address for an instant messaging platform associated with the recipient from an associated database; encoding the voice mail message for transmission to the instant messaging platform; and routing the encoded voice mail message to the address of the instant messaging platform.

Still another aspect of systems and methods according to various embodiments of the invention focuses on methods for responding to a voice mail message received at an instant messaging platform. One particular method includes receiving a message with an encoded voice mail message and an address associated with an originating voice mail platform; generating an indication that the voice mail message has been received by a recipient subscriber; sending the indication from the instant messaging platform to the address associated with the originating voice mail platform; and providing an indication to the originating subscriber to confirm that the recipient subscriber received the voice mail message.

Yet another aspect of systems and methods according to various embodiments of the invention focuses on a voice mail platform for originating and sending a voice mail message to an instant messaging platform. The voice mail platform includes a user interface adapted to provide an option to an originating subscriber for sending a voice mail message to an instant messaging platform associated with a recipient subscriber; receive a user command for sending a voice mail message to the instant messaging platform; and receive a voice mail message for transmission to the instant messaging platform. The voice mail platform also includes a processor adapted to retrieve an address from an associated database for routing to the instant messaging platform; encode the voice mail message for routing via a data network to the instant messaging platform; and route the message via the data network to the address of the instant messaging platform.

Another aspect of systems and methods according to various embodiments of the invention focuses on an instant messaging platform for responding to a voice mail message from an originating subscriber. The instant messaging platform includes a user interface adapted to provide an option to a recipient subscriber for sending a notification to a voice mail service of the originating subscriber; receive a user command for sending the notification to the voice mail service of the originating subscriber; and transmit the notification to the voice mail service of the originating subscriber.

Objects, features and advantages of various systems and methods according to various embodiments of the invention include:

(1) providing systems and methods adapted to originate and send a voice mail message to an instant messaging platform;

(2) providing systems and methods for responding to a voice mail message received at an instant messaging platform;

(3) providing a voice mail service for originating and sending a voice mail message to an instant messaging platform; and (4) providing an instant messaging platform for responding to a voice mail message received at the instant messaging platform.

Other objects, features and advantages of various aspects and embodiments of systems and methods according to the invention are apparent from the other parts of this document.

DETAILED DESCRIPTION OF SPECIFIC EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Terminology:

Before describing the drawings and exemplary embodiments in more detail, several terms are described below in an effort to clarify the terminology used in this document. Additional and fuller understanding of these terms will be clear upon reading this entire document:

Caller: A caller is a participant in a messaging transaction who has placed a telephone call that may result in a message to a subscriber of a region-wide messaging system. A caller may also subscribe to the region-wide messaging system, offered either through the same service provider as that of the subscriber or through another service provider.

Directory: A directory is a collection of information, at least some of which relates to other information, perhaps by way of an index or other relationship. Use of the term directory does not imply any specific architecture or implementation; the important aspect is that the directory fulfill the functions described.

Directory Server: The directory server is the platform holding the database containing the directory. In some embodiments, the directory server may be provisioned directly onto other network elements, such as an AIN SCP. In other embodiments, the directory server may be a server configured to respond to queries from messaging servers in a standard protocol such as an LDAP protocol.

Message: A message is a transmission of information that may be in the form of voice, facsimile, video, e-mail or other data.

Subscriber: A subscriber is a person or entity who receives the benefit of services offered by service providers participating in a region-wide messaging system. The subscriber need not necessarily be the person who actually pays for the services.

Transaction: A transaction is the transfer of a message from one originating device or messaging server (MS) to a destination device such as a telephone or computer or another MS, which may be a different or same type of MS, located in a different or the same region, or operated by a different or the same service provider. The message may be a reply message, a message formulated to go to one or more recipients, a forwarded message (whether fax, another voice mail, video or data), or any other type of message transmitted among the MSs of the region-wide messaging system and intended for review by a desired recipient.

Validated Message: A validated message is a message that may be transferred between and/or among MSs of the region-wide messaging system. In order to determine whether a message is a valid message, any one or combinations of the following conditions may be determined, examined, or both: the identities of the message recipient and sender; the locations of the MSs serving the message recipient and sender; whether regulatory rules allow the proposed message transaction; or whether the recipient's service provider will accept the message. Other conditions and rules for validation may be implemented using methods and systems of the present invention.

Messaging Server: A messaging server (MS) is a platform, including both hardware and software, from which voice mail and other messages and other services involving message transfer, reply, forwarding, etc. are provided to subscribers. The inventions described herein are not restricted to a particular embodiment of voice mail or other messaging server since it is fully intended that different types of voice mail or messaging servers, perhaps operated by respectively different service providers, may be used within and without a region-wide messaging system for messaging transactions.

The exemplary embodiments of the invention are used, preferably, with a region-wide (or regional) messaging (RWM) system, as described in greater detail below. Nevertheless, the invention may be used with any type of messaging system with the appropriate functionality.

The RWM system described herein may allow a subscriber to the messaging system within the region of the service provider to send, receive, forward, and reply to messages, including voice mail messages and Voice Profile for Internet Mail (VPIM) Messages. Subscribers may receive messages from other subscribers and non-subscribers. Subscriber-to-subscriber messaging, however, illustrates the advanced features of the RWM system, which may be available, such as: (1) each subscriber may send a message to another subscriber; (2) each subscriber may reply to a message received from another subscriber; (3) each subscriber may reply to a telephone message received from a non-subscriber by implementing a feature that dials the non-subscriber; and (4) each subscriber may receive and reply to internet voice messages or fax messages.

Figure 1:
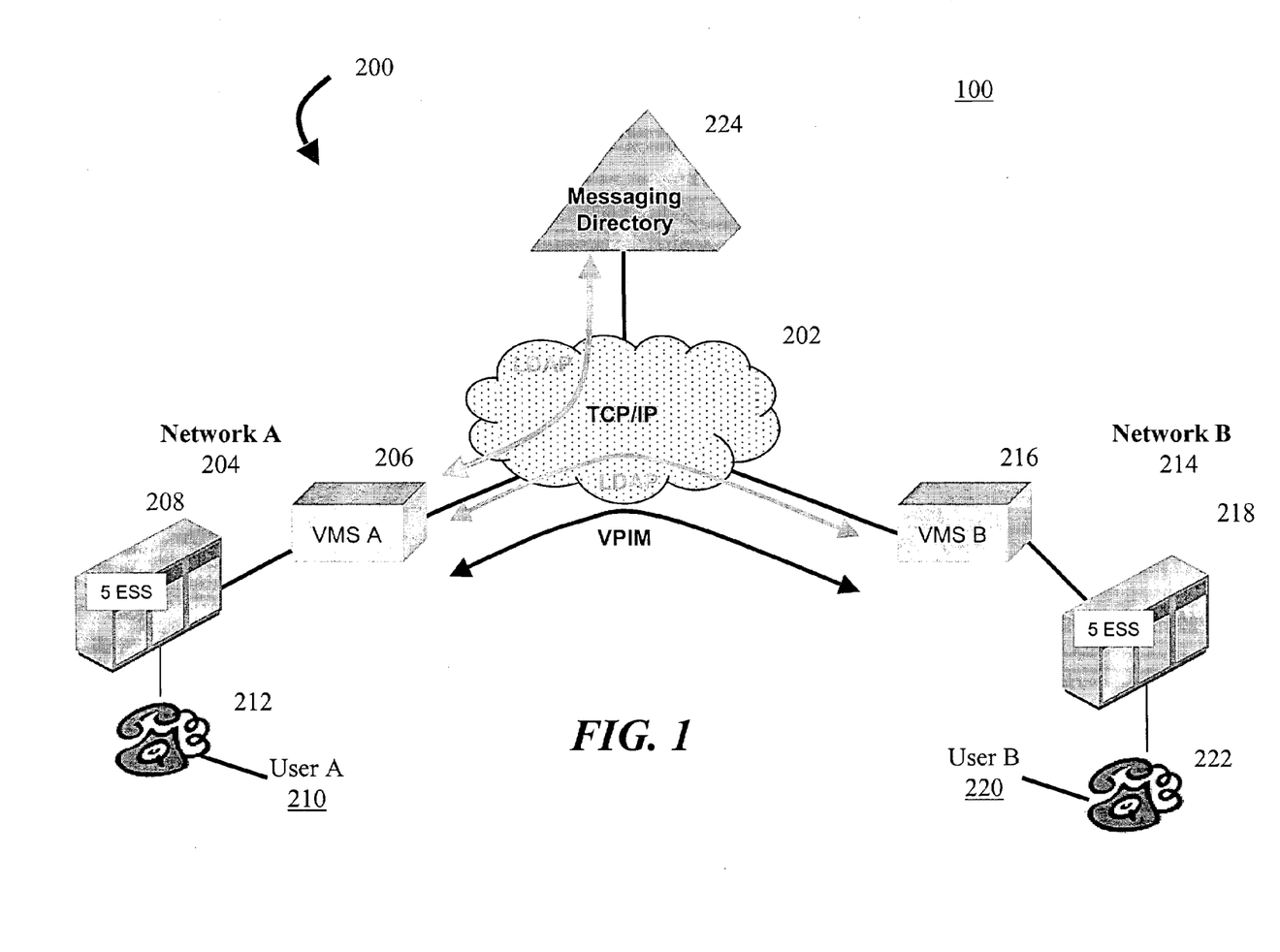
FIG. 1 is a functional block diagram of an exemplary embodiment of a region-wide messaging system in which systems and methods of the invention may be deployed.

FIG. 1 illustrates a telecommunications environment 100 with an exemplary RWM system 200 in accordance with various embodiments of the invention. The RWM system 200 of FIG. 1 includes a data network 202 which may be an internet, intranet, or other data or communications network using at least one standard protocol to transmit messages through the network. A standard protocol may be the Transmission Control Protocol/Internet Protocol (TCP/IP), the Light-weight Directory Access Protocol (LDAP), which is a TCP/IP-based derivative of the X.500 electronic mail (e-mail) delivery service, Profile for Internet Mail (VPIM) protocol, or the like.

In the exemplary RWM system 200, the data network 202 connects to a network A 204 with a voice mail server A (VMS A) 206 and a central office 208 or switch. Typically, the VMS A 206 is operated by a service provider to provide messaging services to subscribers such as user A 210 utilizing customer premises equipment 212.

The data network 202 also connects to a network B 214 with a voice mail server B (VMS B) 216 and a central office 218 or switch. Note that a network can have more than one voice mail servers operated by the same or different service providers to provide messaging services to a respective group of subscribers. VMS B 216 provides messaging services to subscribers such as user B 220 utilizing customer premises equipment 222.

Moreover, the data network 202 connects to an extended messaging directory 224 or another similar type of directory. The data network 202 uses the extended messaging directory 224 to determine the address of or other routing information for a message received by the data network 202.

Note that an extended messaging directory 224 can be can be based upon a region-wide messaging directory (RMD or directory). The extended messaging directory 224 is functionally connected to the other elements of the RWM system 200 through inclusion in or a connection to the data network 202 such as a TCP/IP network. Although the extended messaging directory 224 is illustrated as connected to the system 200 through the data network 202 such as a TCP/IP network, the extended messaging directory 224, or course, may be connected to the system 200 in other ways or even be included in an element of the system such as in association with at least one directory of a service control point (SCP). An extended messaging directory 224 provides high-speed directory look-up for messaging subscribers. Generally, an extended messaging directory 224 stores information so as to determine which messaging platform of the RWM system 200 serves which subscriber. Additional information on the manner in which the extended messaging directory 224 of the system 200 store information on messaging platforms and subscribers and how an extended messaging directory 224 interacts with a network element may be obtained from the commonly assigned and owned patent application entitled "Methods and System for Determining Message Routing Based on Elements of a Directory Number", which was filed with the United States Patent and Trademark Office on Dec. 13, 1999 and assigned Ser. No. 09/459,498, and which was filed with the United States Receiving Office pursuant to the Patent Cooperation Treaty (PCT) on Dec. 13, 1999 and assigned Application No. PCT/US99/29491. Both applications are incorporated herein by reference.

Of course, an extended messaging directory 224 may keep track of other information relating to subscribers of the RWM system 200. In particular, the extended messaging directory 224 may act as both a client and a server with respect to the Light-weight Directory Access Protocol (LDAP). The extended messaging directory 224 stores subscriber, service, and other messaging data. In addition, the extended messaging directory 224 supports the LDAP attributes field for LDAP clients to choose the fields that they desire to retrieve from the server. Clients may retrieve the subscriber profile from the extended messaging directory 224.

Subscriber data may be stored in the extended messaging directory 224 in the following exemplary fashion:
Description/Directory Field LDAP DN Attribute
Subscriber's Mailbox Number CN (Common Name)
Name Announcement Spoken Name
MDSBlocking N/A Subscriber data is used to look up subscribers in the extended messaging directory 224. The data is also used for the purposes of routing and billing a subscriber's calls and messages to and from the messaging platforms.

Service data may be stored in the extended messaging directory 224 in the following exemplary fashion:
Description/Directory Field LDAP DN Attribute
VMS ID VMSID
VMS DAP Number VMSDN
VMS Domain Domain
VoiceEncoding N/A
LATA N/A
State N/A
State LATA N/A
LDAP Credentials N/A Hidden in LDAP query
VMS IP addres The service data contains messaging platform-specific information to perform certain checks during directory lookup and call/message routing. The extended messaging directory 224 may also store service provider data to ensure that a service provider has access to only its authorized subscribers' information.

Figure 2:
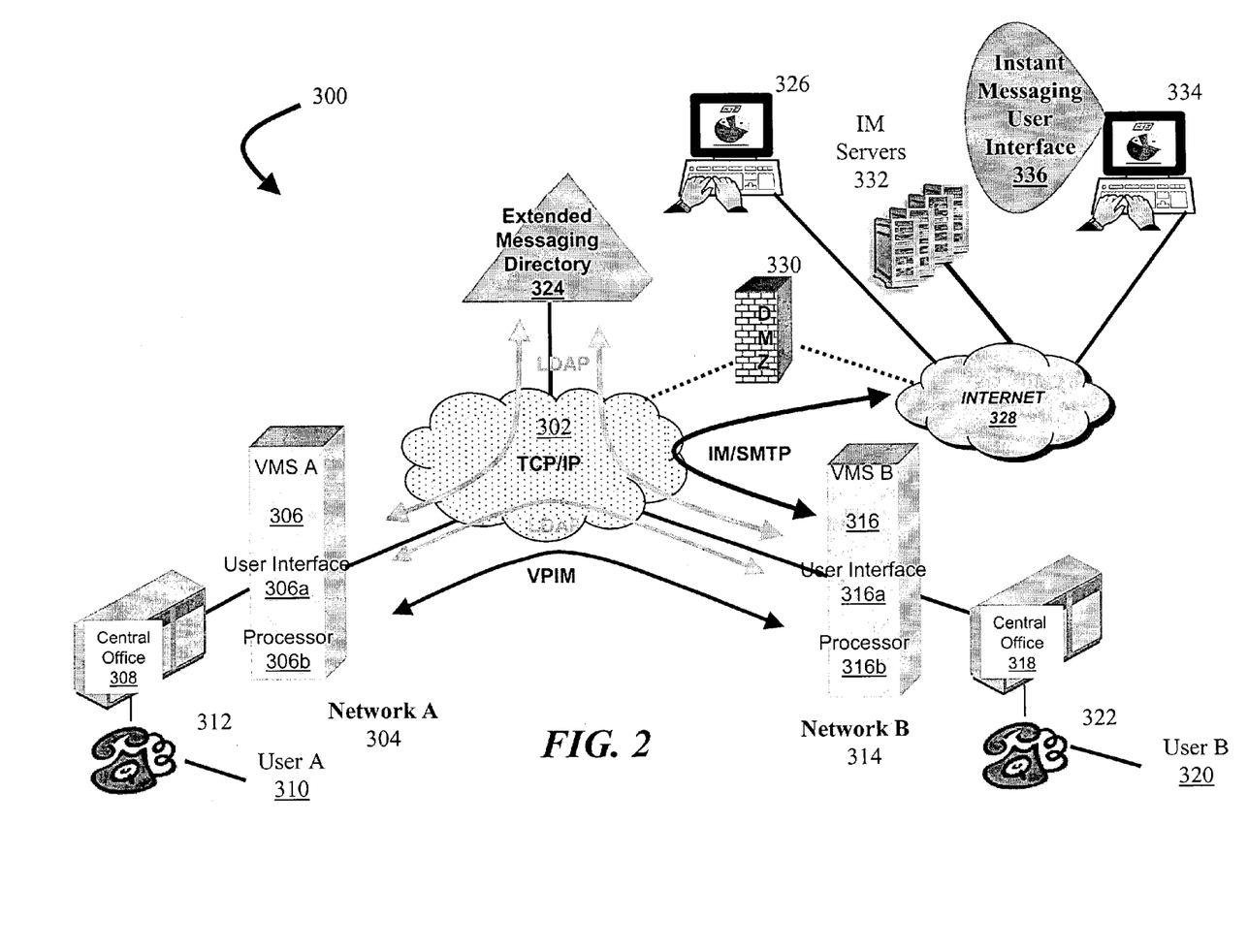
FIG. 2 is a functional block diagram of another exemplary embodiment of a region-wide messaging system in which systems and methods of the invention may be deployed.

FIG. 2 illustrates an exemplary RWM system 300 that is modified from the RWM system 200 illustrated in FIG. 1. Nevertheless, the functionality of the RWM system 200 from FIG. 1 may be found in and used by the RWM system 300 of FIG. 2.

The RWM system 300 of FIG. 2 includes a data network 302 which may be an internet, intranet, or other data network using at least one standard protocol to transmit messages through the data network. A standard protocol may be the Transmission Control Protocol/Internet Protocol (TCP/IP), the Light-weight Directory Access Protocol (LDAP), which is a TCP/IP-based derivative of the X.500 electronic mail (e-mail) delivery service, Profile for Internet Mail (VPIM) protocol, or the like.

In the exemplary RWM system 300, the data network 302 connects to a network A 304 with a voice mail server A (VMS A) 306 including a user interface 306a and a processor 306b. In turn, the voice mail server A (VMS A) 306 connects to a central office 308 or switch. Typically, the VMS A 306 is operated by a service provider to provide messaging services to subscribers such as user A 310 utilizing customer premises equipment 312.

The data network 302 also connects to a network B 314 with a voice mail server B (VMS B) 316 with a user interface 316a and a processor 316b. In turn, the voice mail server B (VMS B) 316 connects to a central office 318 or switch. Note that a network can have more than one voice mail servers operated by the same or different service providers to provide messaging services to a respective group of subscribers. VMS B 316 provides messaging services to subscribers such as user B 320 utilizing customer premises equipment 322.

Typically, a VMS 306, 316 includes a user interface 306*a*, 316*a* adapted to receive a voice mail message from a sending subscriber, or otherwise handle an incoming voice mail message from a subscriber. The user interface 306*a*, 316*a* may include a voice or keypad-driven menu that prompts the subscriber to leave a voice mail message for a recipient subscriber. Once the voice mail message is received by the user interface 306*a*, 316*a*, the user interface 306*a*, 316*a* prompts the calling subscriber for a command of whether to transmit the voice mail message to an instant messaging platform associated with the recipient subscriber. If the user interface 306*a*, 316*a* receives a command to transmit the voice mail message to an instant messaging platform, the user interface 306*a*, 316*a* may prompt the calling subscriber to enter an address or routing-type information such as a buddy name, a buddy list if more than one recipient subscribers exist, or an instant messaging-type address. In some instances, a list of addresses may be previously stored, and the calling subscriber will be provided the option to select from one or more of the previously stored addresses.

Alternatively, a voice mail message from a calling subscriber can be automatically transmitted to an instant messaging platform. In any instance, the voice mail message can be transmitted to an instant messaging platform when address or routing-type information is available.

Typically, each VMS 306, 316 includes a processor 306*b*, 316*b*, or can otherwise access a processor, that can convert or encode a received voice mail message to a text message using best available or conventional voice-to-text conversion techniques, methods, and associated devices. Furthermore, the associated processor 306*b*, 316*b* for each VMS 306, 316 can retrieve an address from an associated database for routing the encoded voice mail message to the address. Moreover, the processor 306*b*, 316*b* can send the encoded voice mail message in a protocol suitable for transmission via the data network 302 and/or the Internet 328 to an address designated by the associated database for an instant messaging platform 334. A suitable protocol is Simple Mail Transfer Protocol (SMTP).

Moreover, the data network 302 connects to an extended messaging directory 324 or another similar type of directory. The data network 302 uses the extended messaging directory 324 to determine the address of a recipient subscriber or to determine other routing information for a message received by the data network 302. In this example, the routing information can be one or more addresses corresponding to a "buddy name" in a "buddy list" for an instant messaging platform.

Alternatively, the extended messaging directory 324 can be a component of or in direct communication with another network such as network A 304 and/or network B 314. In this example, the extended messaging directory 324 keeps track of which users (telephone numbers, directory numbers, addresses, buddy names, buddy lists, user id's or the like identifiers). The extended messaging directory 324 can map any number of users to a respective internet protocol (IP) address associated with an instant messaging platform.

In another embodiment, addresses of or other routing information such as one or more addresses corresponding to a "buddy name" in a "buddy list" for an instant messaging platform can be stored by either or both VMSs 306, 316.

A processor-based platform such as a personal computer 326 can access either the extended messaging directory 324 or a VMS 306, 316 via the data network 302. A user operating the personal computer 326 may populate an address map stored by the extended messaging directory 324 or the VMSs 306, 316. The user may provide one or more buddy names or buddy lists that have corresponding addresses. In other instances, previously stored addresses, routing information, buddy names, buddy lists, and the like stored at the extended messaging directory 324 or the VMSs 306, 316 can be accessed, changed, or otherwise modified by a user operating the personal computer 326.

In any instance, the address or routing information for a particular subscriber (recipient subscriber) is ultimately transmitted to and encoded by the VMS 306, 316. Similar to the processing of the voice mail message, the address or routing information is encoded or otherwise associated with the text message for transmission to the instant messaging platform 334.

For example, a message containing voice-to-text and an address or routing information could be organized as follows. A conventional e-mail message can have a "To:" field with the address or routing information of the recipient subscriber; a "From:" field with a phone number of the calling subscriber; and a "message" field containing the text of the voice mail message. In other instances, the "To:" and "From:" fields may contain other address-type or routing information such as the calling subscriber's name, a name associated with a calling subscriber's phone number, or a domain name.

A second data network such as the Internet 328, an intranet or the like connects to the data network 302. In the embodiment shown, the Internet 328 connects to the data network 302 via a firewall such as a DMZ 330 or similar type device. One skilled the art will be familiar with devices, techniques, and methods for transmitting data through a firewall. Note that the invention is not limited by the use of or the lack of a firewall such as a DMZ 330.

One or more instant messaging (IM) servers 332 connect to the second data network such as the Internet 328. The IM servers 332 provide instant messaging functionality to one or more instant messaging platforms 334 such as a computer, personal computer, personal digital assistant, or other processor-based device or communications platform. Each IM server 332 can queue or store at least one instant message until called upon by a subscriber, instant messaging platform 334 or an associated user interface. One skilled in the art will be familiar with the devices, techniques, and protocols utilized with and by conventional instant messaging platforms.

In some instances, an instant messaging server 332 can administer one or more accounts such as an instant messaging account that can be accessed by an instant messaging platform 324. Each account may have an unique address to identify and provide access to the specific account.

An instant messaging user interface 336 executes or is otherwise displayed upon at least one of the instant messaging platforms 334. Typically, a subscriber operates an instant messaging platform 334. If the subscriber is present, the subscriber can call for any queued or stored instant messages from at least one IM servers 332 via the instant messaging user interface 336. The instant messaging user interface 336 provides user options and commands to a recipient subscriber, and further provides feedback from the recipient subscriber back to the IM servers 332. In other instances, instant messages can be queued or stored at an IM server 332 or instant messaging platform 334 until called upon by a subscriber via the instant messaging user interface 336.

One example of an instant messaging user interface 336 can be a graphical user interface such as a control panel on an associated display device of an instant messaging platform, such as a display monitor for a personal computer. Such an user interface can be adapted to provide an option for sending a notification to a voice mail service 306, 316 of the originating subscriber. The user interface 336 can then receive a user command for sending the notification to the voice mail service of the originating subscriber. Moreover, the user interface 336 can transmit the notification to the voice mail service of the originating subscriber via the Internet 328 and/or data network 302.

Figure 3:
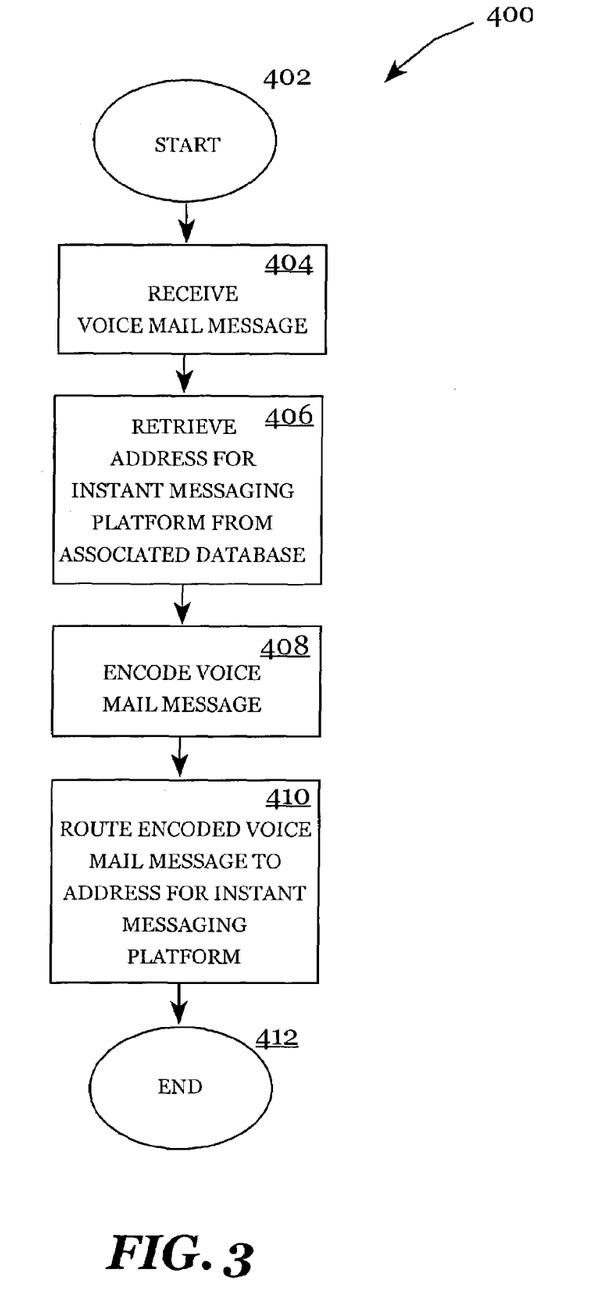
FIG. 3 is a flowchart of a method in accordance with various embodiments of the invention.

FIG. 3 is a flowchart of a method in accordance with various embodiments of the invention. With reference to system elements of FIG. 2, the method 400 shown in FIG. 3 is directed to originating and sending a voice mail message to an instant messaging platform. The method 400 begins at 402, and proceeds to 404.

At 404, a voice mail message is received. Generally, a VMS 306, 316 receives a message from a subscriber. For instance, a subscriber (sending subscriber) calls another subscriber, and when the other subscriber cannot answer the call, the call is transferred to a VMS 306, 316 to provide the sending subscriber with the option to leave a message, and further to send an instant message to the other subscriber (recipient subscriber). As previously defined, the voice mail message can be a transmission of information that may be in the form of voice, facsimile, video, e-mail or other data. Typically, the VMS 306, 316 provides a user interface for the subscriber to enter a message either by voice or keypad. An option provided by the user interface can be whether to leave a conventional voice mail message or to transmit an instant message to the other subscriber. The VMS 306, 316 receives the subscriber's commands and respective message, and the VMS 306, 316 can either store the message or otherwise handle the message for subsequent transmission to another subscriber.

From 404, the method proceeds to 406, in which an address is retrieved for an instant messaging platform from an associated database. When a subscriber instructs the VMS 306, 316 to transmit an instant message, the VMS 306, 316 retrieves a corresponding address for an instant messaging user from an associated database. For instance, the associated database can be an extended messaging directory 324 in communication with a VMS 306, 316. When a command is received from a subscriber to send an instant message to another subscriber, a corresponding address can be retrieved from the extended messaging directory 324. Typically, one or more subscribers' addresses associated with a respective instant messaging platform 334 are mapped at the extended messaging directory 324 or an associated database. Thus, when a VMS 306, 316 attempts to retrieve an address such as an internet protocol (IP) address associated with a particular instant messaging platform 324, the VMS 306, 316 looks up a particular subscriber in the extended messaging directory 324 or associated database by name, telephone number, or other identifying data to cross-reference an address such as an internet protocol (IP) address for that subscriber. The address for the subscriber is then returned to the VMS 306, 316 for further processing of the voice mail.

In some instances, an address may be associated with an account such as an instant messaging account that can be accessed by an instant messaging platform 324. As described above, an account may be stored or otherwise administered by an instant messaging (IM) server 332. In any event, each address is a unique address for use in directing a message to a particular subscriber or location.

From 406, the method 400 proceeds to 408. In 408, a voice mail message is encoded. Typically, a message such as a voice mail message is encoded into a text message suitable for transmission to and viewing at an instant messaging platform. Using a protocol suitable for transmission via the data network 302 and the Internet 328, a message corresponding to the voice mail message can be transmitted to an instant messaging platform. Suitable protocols for transmission of a message to an instant messaging platform can include, but are not limited to, Simple Mail Transfer Protocol (SMTP) or another protocol that is compatible for viewing or receipt by an instant messaging platform. For instance, a voice message can be encoded into a text message using best available or conventional voice-to-text conversion techniques, methods, and associated devices. Other types of messages can be encoded using suitable types of conversion techniques, methods, or devices as needed.

In addition to the message, the address from the extended messaging directory 324 or an associated database can be encoded into or otherwise associated with the message for transmission to the instant messaging platform 334.

From 408, the method 400 proceeds to 410, in which the encoded voice mail message is routed to the address of the instant messaging platform. Using the address for the instant messaging platform, the VMS 306, 316 routes the message via the data network 302 and/or Internet 328 to the instant messaging platform 334 corresponding to the address. Typically, the message is handled by one or more instant messaging servers 332 in communication with the data network 302 and/or Internet 328. At least one of the instant messaging servers 332 directs or routes the message to the corresponding address of a particular subscriber (recipient subscriber) operating an instant messaging platform 334. The instant messaging servers transmit the message to the instant messaging platform in a format that can be viewed by a recipient subscriber at the instant messaging user interface 336.

From 410, the method 400 proceeds to 412. In 412, the method 400 ends.

Figure 4:
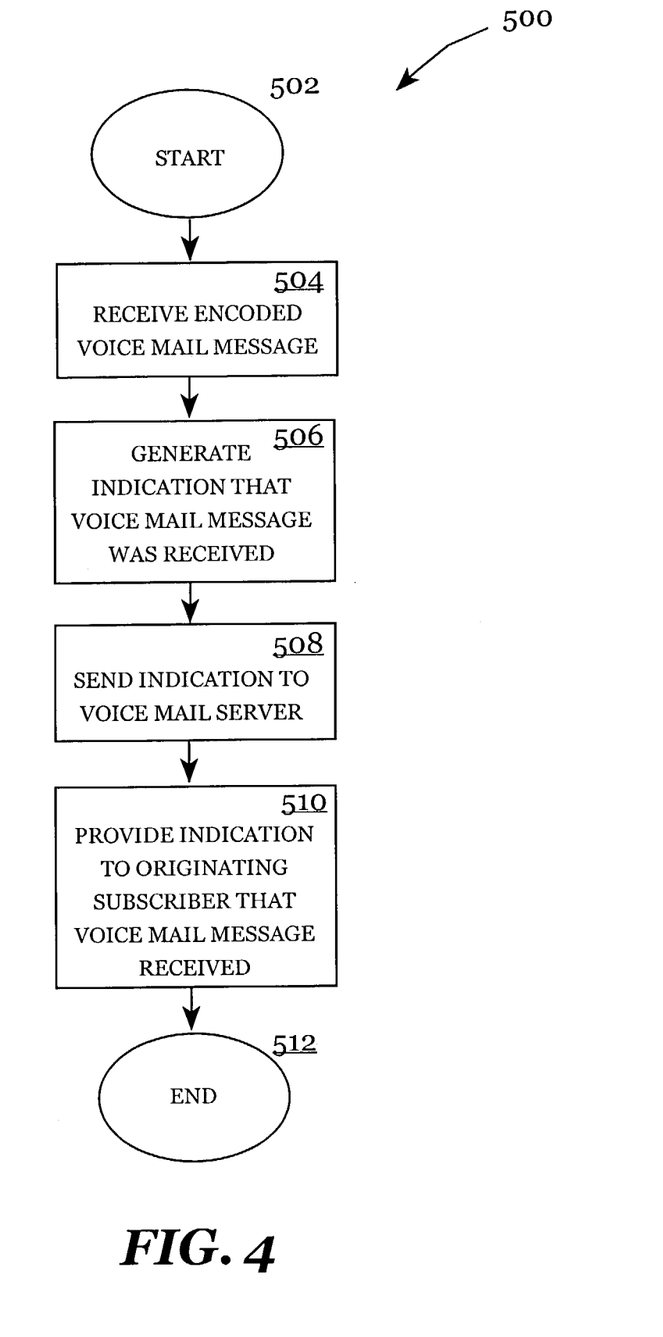
FIG. 4 is a flowchart of another method in accordance with various embodiments of the invention.

FIG. 4 is a flowchart of another method in accordance with various embodiments of the invention. With reference to system elements in FIG. 2, the method 500 as shown in FIG. 4 is directed to responding to a voice mail message received at an instant messaging platform. At 502, the method 500 begins.

From 502, the method 500 proceeds to 504, in which a message is received with an encoded voice mail message associated with an originating voice mail platform. Generally, a recipient subscriber operating an instant messaging platform 334 logs into an instant messaging account to receive or otherwise receive one or more instant messages via the instant messaging user interface 336. In this example, the recipient subscriber receives a message with an encoded voice mail message and an address associated with an originating voice mail platform. An instant messaging account can be hosted by one or more IM servers 332 accessible by the instant messaging platform 334 via the Internet 328.

From 504, the method 500 proceeds to 506, in which an indication is generated that the voice mail message has been received by a recipient subscriber. The instant messaging platform 334 includes a user interface 336 that can provide a user option to send a reply to or otherwise send a notification back to an originating subscriber. Typically, the user interface is adapted to offer one or more user commands to a subscriber, and to receive user input for at least one user command. In response to particular user input, the user interface 336 can generate a notification from or otherwise send an indication from a recipient subscriber. Alternatively, the user interface can automatically generate a notification from or send indication upon the receipt of the message by the recipient subscriber.

For instance, a recipient subscriber may not be logged into an instant messaging platform 334 at a particular instant or time that a message is received. Any messages sent to the instant messaging platform 334 while the recipient subscriber is not logged in can be queued or otherwise stored by an associated instant messaging (IM) server 332 for subsequent delivery to the recipient subscriber when the recipient subscriber logs in to the instant messaging platform 334 or to an instant messaging account associated with the recipient's address for the message. Thus, when the recipient subscriber logs in to the instant messaging platform or to an instant messaging account to retrieve an instant message, the IM server 332 delivers or otherwise posts queued or stored messages to the instant messaging platform 334 for viewing by the recipient subscriber. When the recipient user opens a particular message, the instant messaging user interface 336 generates a notification or an indication indicating that the recipient subscriber has received the message.

From 506, the method 500 proceeds to 508, in which the indication is sent from the instant messaging platform 334 to the address associated with an originating voice mail platform. A notification or indication generated by the instant messaging platform 334 indicating that the recipient subscriber has received the instant message can be sent to the originating VMS 306, 316. The notification or indication includes the address or routing information of the originating subscriber, such as the subscriber's directory number. The originating VMS 306, 316 receives the notification or indication from the instant messaging platform 334, and references the originating subscriber's address or routing information. In some instances, a notification or indication to the originating subscriber can reference the message originally encoded and sent by the VMS 306, 316 to the instant messaging platform 334. In most cases, the notification or indication is associated with information of the originating subscriber. This information can include, but is not limited to, a telephone number, an IP address, or other address-type or routing information.

From 508, the method 500 proceeds to 510, in which an indication is provided to the originating subscriber that the voice mail message was received. Using the information from the notification or indication from the instant messaging platform 334, the VMS 306, 316 sends an indication to the originating subscriber to notify the originating subscriber that the recipient subscriber has received the encoded voice mail message. Typically, the originating subscriber can be notified by the VMS 306, 316 via the user interface 306a, 316a associated with each respective VMS 306, 316. For example, a VMS 306, 316 could provide an indication by notifying the originating subscriber via a voice mail message stored or otherwise queued by the VMS 306, 316 on the originating subscriber's voice mail account. In other instances, a VMS 306, 316 could provide an indication by notifying the originating subscriber via an instant message (IM), a short messaging service (SMS), or another communications format, method, or device.

From 510, the method 500 proceeds to 512, in which the method 500 ends. One should note that in at least one exemplary embodiment, the method could also include prompting the subscriber to enter a name associated with an instant messaging platform.

While the above description contains many specifics, these specifics should not be construed as limitations on the scope of the invention, but merely as exemplifications of the disclosed embodiments. Those skilled in the art will envision many other possible variations that within the scope of the invention as defined by the claims appended hereto.

The invention I claim is:

1. A method for receiving a voice mail message and routing an encoded voice mail message to an instant messaging platform via a network, comprising:
    receiving a voice mail message for a recipient;
    providing a delivery option to a sender of the received voice mail message to determine a method for delivery for the received voice mail message, wherein the delivery option provides the sender with the ability to choose from the following: sending the voice mail message to a voice mail server associated with the recipient and sending the voice mail message to an instant messaging platform associated with the recipient;
    based upon recipient identifying information, obtaining an address for an instant messaging platform associated with the recipient from an associated database;
    in response to receiving a user selection that the received voice mail message is to be sent to the instant messaging platform, encoding the voice mail message for transmission to the instant messaging platform; and
    routing the encoded voice mail message to the address of the instant messaging platform.

2. The method of claim 1, wherein receiving a voice mail message comprises:
    receiving a call from a subscriber;
    prompting the subscriber to send a message;
    prompting the subscriber to enter a name associated with an instant messaging platform; and
    storing a message from the subscriber.

3. The method of claim 1, wherein the address is an Internet protocol address for an instant messaging platform.

4. The method of claim 1, wherein the associated database is an enhanced messaging directory.

5. The method of claim 1, wherein the associated database is a remote computer.

6. The method of claim 1, wherein encoding the voice mail message comprises:
    encoding the address of the instant messaging platform into an instant message format; and
    encoding the voice mail message into an instant message format.

7. The method of claim 1, wherein encoding the voice mail message for transmission to the instant messaging platform comprises:
    utilizing a voice-to-text protocol to convert the voice mail message to a text message; and
    utilizing a data protocol to convert the text message to a message adapted for transmission to an instant messaging platform.

8. The method of claim 6, wherein the data protocol is SMTP.

9. The method of claim 1, wherein the network is the Internet.

10. The method of claim 1, wherein routing the encoded voice mail message via a network to the address of the instant messaging platform comprises:
    sending the encoded voice mail message to an Internet protocol address for an instant messaging platform.

11. The method of claim 1, further comprising:
    notifying a recipient subscriber that the encoded voice mail message is received.

12. A system for originating and sending a voice mail message to an instant messaging platform, comprising:
a voice mail service adapted to:
receive a voice mail message and information associated with a recipient subscriber,
provide a delivery option to a sender of the received voice mail message to determine a method for delivery for the received voice mail message, wherein the delivery option provides the sender with the ability to choose from the following: sending the voice mail message to a voice mail server associated with the recipient subscriber and sending the voice mail message to an instant messaging platform associated with the recipient subscriber;
request an instant messaging address associated with the recipient subscriber's information, and
encode the voice mail message for transmission to an instant messaging platform;
an associated database adapted to provide the voice mail service with an instant messaging address associated with the recipient subscriber's information;
an instant messaging platform adapted to receive the encoded voice mail message from the voice mail service; and
a network in communication with the voice mail platform and the instant messaging platform, wherein the voice mail platform transmits the encoded voice mail message to the instant messaging address, and the network routes the encoded voice mail message to the instant messaging platform.

13. The system of claim 12, further comprising:
an instant messaging server adapted to,
receive the encoded voice mail message from a voice mail service via the network,
queue the encoded voice mail message in an instant messaging account associated with the recipient subscriber, and
transmit the encoded voice mail message to an instant messaging platform at a predetermined time.

14. The system of claim 12, wherein the associated database is an extended messaging directory adapted to reference an instant messaging address associated with a subscriber.

15. The system of claim 12, wherein the associated database is an extended messaging directory adapted to reference an address associated with an instant messaging platform.

16. The system of claim 12, wherein the instant messaging platform includes at least one of the following: a computer, a personal computer, a personal digital assistant, a processor-based device.

17. A voice mail service for originating and sending a voice mail message to an instant messaging platform, comprising:
a user interface adapted to,
receive a voice mail message,
provide a delivery option to an originating subscriber of the received voice mail message to determine a method for delivery for the received voice mail message, wherein the delivery option provides the originating subscriber with the ability to choose from the following: sending the voice mail message to a voice mail server associated with a recipient subscriber and sending the voice mail message to an instant messaging platform associated with the recipient subscriber, and
receive a user command for sending a voice mail message to the instant messaging platform; and
a processor adapted to,
retrieve an address from an associated database for routing to the instant messaging platform,
encode the voice mail message for routing via a data network to the instant messaging platform, and
route the message via the data network to the address of the instant messaging platform.

* * * * *